US008909499B2

(12) United States Patent
Garrard et al.

(10) Patent No.: US 8,909,499 B2
(45) Date of Patent: Dec. 9, 2014

(54) PROCESSING POSITION-RELATED INPUT DATA FROM A ROTATIONAL MACHINE WHOSE ANGULAR SPEED IS VARIABLE

(75) Inventors: Mike Garrard, Chelmsford (GB); Geoff Emerson, Glasgow (GB); Alistair Robertson, Glasgow (GB)

(73) Assignee: Freescale Semiconductor, Inc., Austin, TX (US)

( * ) Notice: Subject to any disclaimer, the term of this patent is extended or adjusted under 35 U.S.C. 154(b) by 909 days.

(21) Appl. No.: 12/999,084

(22) PCT Filed: Jul. 3, 2008

(86) PCT No.: PCT/IB2008/052679

§ 371 (c)(1), (2), (4) Date: Dec. 15, 2010

(87) PCT Pub. No.: WO2010/001199

PCT Pub. Date: Jan. 7, 2010

(65) Prior Publication Data

US 2011/0093236 A1 Apr. 21, 2011

(51) Int. Cl.
*G01P 3/00* (2006.01)
*F02D 41/00* (2006.01)
*F02D 35/02* (2006.01)

(52) U.S. Cl.
CPC ............ *F02D 35/023* (2013.01); *F02D 41/009* (2013.01); *F02D 2250/14* (2013.01)
USPC .......................................................... 702/145

(58) Field of Classification Search
USPC ........... 702/90, 91, 94, 96, 98, 138, 142, 145, 702/182, 183, 185, 151
See application file for complete search history.

(56) References Cited

U.S. PATENT DOCUMENTS 6,006,155 A * 12/1999 Wu et al. ....................... 701/111
7,242,326 B1 7/2007 Melanson et al.

(Continued)

FOREIGN PATENT DOCUMENTS

| | | | |
|---|---|---|---|
| EP | 0647774 | A | 4/1995 |
| EP | 1905989 | A | 4/2008 |
| JP | 2000186611 | A | 7/2000 |
| JP | 2001263153 | A | 9/2001 |

OTHER PUBLICATIONS

Aziz P M et al. "An Overview of Sigma-Delta Converters" IEEE Signal Processing Magazine, IEEE Service Center, Piscataway, NJ, US, vol. 13, No. 1, Jan. 1, 1996.

International Search Report and Written Opinion correlating to PCT/IB2008/052679 dated Jul. 15, 2009.

*Primary Examiner* — Mohamed Charioui

(57) ABSTRACT

A data processor and method for processing position-related input data from a rotational machine whose angular speed is variable and providing output data at an output data rate. The processor comprises a time-based over-sampler for over-sampling the input data at an over-sampling rate greater than the output data rate, and a down-sampler for extracting samples of over-sampled data from the over-sampler at the output data rate so as to provide the output data. The down-sampler is responsive to an angular timing signal related to an angular position of the machine for selecting the samples of over-sampled data to extract based on the angular position. Application to a rotational machine whose angular speed is variable, in particular to an internal combustion engine to control engine operating parameters as a function of cylinder pressure.

20 Claims, 2 Drawing Sheets

(56) References Cited

U.S. PATENT DOCUMENTS

| | | | | |
|---|---|---|---|---|
| 7,242,327 | B1 | 7/2007 | Thompson | |
| 7,459,872 | B2 * | 12/2008 | Woodland et al. | 318/605 |
| 2005/0166665 | A1 | 8/2005 | Honda | |
| 2006/0206254 | A1 | 9/2006 | Remelman | |

* cited by examiner

PROCESSING POSITION-RELATED INPUT DATA FROM A ROTATIONAL MACHINE WHOSE ANGULAR SPEED IS VARIABLE

FIELD OF THE INVENTION

This invention relates to processing position-related input data from a machine whose angular speed is variable. More specifically, the invention relates to a data processor, that is to say a device, apparatus or system for performing logical operations on the data, and to a method of processing data.

BACKGROUND OF THE INVENTION

The variable angular speed of a machine means that angle-based data (that is to say position-related data occurring as a function of the angular position of the machine) has a variable time-based repetition rate. Known data processors for such machines require intensive processor and memory resources.

An example of a machine whose speed fluctuates is an internal combustion engine. For an internal combustion piston-and-cylinder engine, optimal operating parameters such as cylinder filling and burn characteristics are functions of the instantaneous pressure in the cylinder, which is a function of the angular-position of the crank-shaft. It is possible to control such parameters in response to a pressure signal from a pressure sensor in the cylinder.

For example, engine manufacturers use such pressure sensors in the cylinders to determine initial calibration in dynamometer cells. An example of a method of obtaining, for the purpose of analysis, real-time engine knock data derived from an operating internal combustion engine is described in US Patent Application 20060206254.

Theoretically, a system of this kind could be applied in a commercialised vehicle. However, practical difficulties have so far presented obstacles to such commercial applications, so that production vehicles use sensors of parameters such as mass air flow and air temperature along with an engine model to estimate cylinder filling and burn characteristics instead of cylinder pressure sensors, with results that are sub-optimal.

Among the practical difficulties encountered are that the pressure signal from a pressure sensor is small and noisy. Accordingly, filtering is required to clean up the pressure signal, using a filter having a low pass or band pass frequency characteristic. However, running a fixed frequency filter on variable speed and time repetition rate data is mathematically complex and uses processor resources intensively.

Instead of running a fixed frequency filter on variable time repetition rate data, the pressure signal can be sampled at regular time intervals. This makes the frequency filter straightforward and also may suit knock detection since knock is a frequency based signal. However, the data then needs to be converted into crankshaft angle based results for calculation of engine parameters. Conversion of time-based signals to results related to crankshaft angle accurately and precisely is again mathematically complex and uses processor resources intensively. In addition this conversion requires large quantities of system random access memory ('RAM') for buffering the time based data.

In addition, the rotational speed of an internal combustion engine is not constant during the combustion cycle (720° in a four-stroke engine) but fluctuates during the course of a revolution, with accelerations and decelerations. The calculations to determine engine parameters are based on the crankshaft angle but these angular-position-related intervals do not occur with a constant repetition rate in the time domain, because of the variable and fluctuating engine speed.

Similar problems are encountered in processing position-related input data from other machines whose speed is variable.

SUMMARY OF THE INVENTION

The present invention provides a data processor, a method of processing data, a computer program for processing data and a machine as described in the accompanying claims.

Specific embodiments of the invention are set forth in the dependent claims.

These and other aspects of the invention will be apparent from and elucidated with reference to the embodiments described hereinafter

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
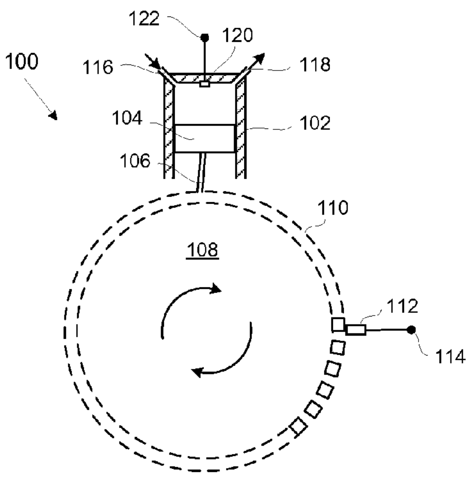
FIG. 1 is a schematic diagram of an example of an internal combustion engine to which an embodiment of the present invention can be applied.

The embodiments of the invention illustrated in the drawings are described with reference to application in an internal combustion piston-and-cylinder engine. However, it will be appreciated that the invention is applicable to other machines whose speed is variable and which need position-related data to be processed.

FIG. 1 is a sectional view through one cylinder 102 of an internal combustion piston-and-cylinder engine 100, of the kind found in automobiles, for example. The internal combustion engine 100 is a rotary engine whose angular speed fluctuates during the course of a revolution. It will be appreciated that the internal combustion engine 100 is only an example of a rotational machine whose angular speed is variable and that the invention is applicable to other variable speed rotational machines.

Typically, such an engine comprises multiple cylinders, for example four, six or more, each having a piston such as 104 coupled by a respective connecting rod 106 to a crankshaft (not shown), which in turn is coupled to a flywheel 108. The flywheel presents timing teeth 110 whose passage during rotation of the flywheel is sensed by a crank angle sensor 112. The crank angle sensor 112 of the engine 100 is an example of a position-responsive generator for producing an angular timing signal related to a rotational position of the machine. The crank angle sensor 112 may, for example, be a magnetic sensor when the timing teeth are of magnetic material, and which provides a train of electrical pulses at a crank angle terminal 114. The cylinders each have at least one combustion mixture inlet such as 116 and at least one exhaust outlet such as 118 which are opened and closed by valves (not shown) at suitable times defined by an engine controller (not shown in FIG. 1). The engine shown in FIG. 1 also comprises a pressure sensor 120, which provides an analogue signal at a pressure terminal 122 proportional to the instantaneous pressure in the cylinder. The pressure sensor 120 is an example of a sensor responsive to a performance-related variable which is a function of the angular position.

Figure 2:
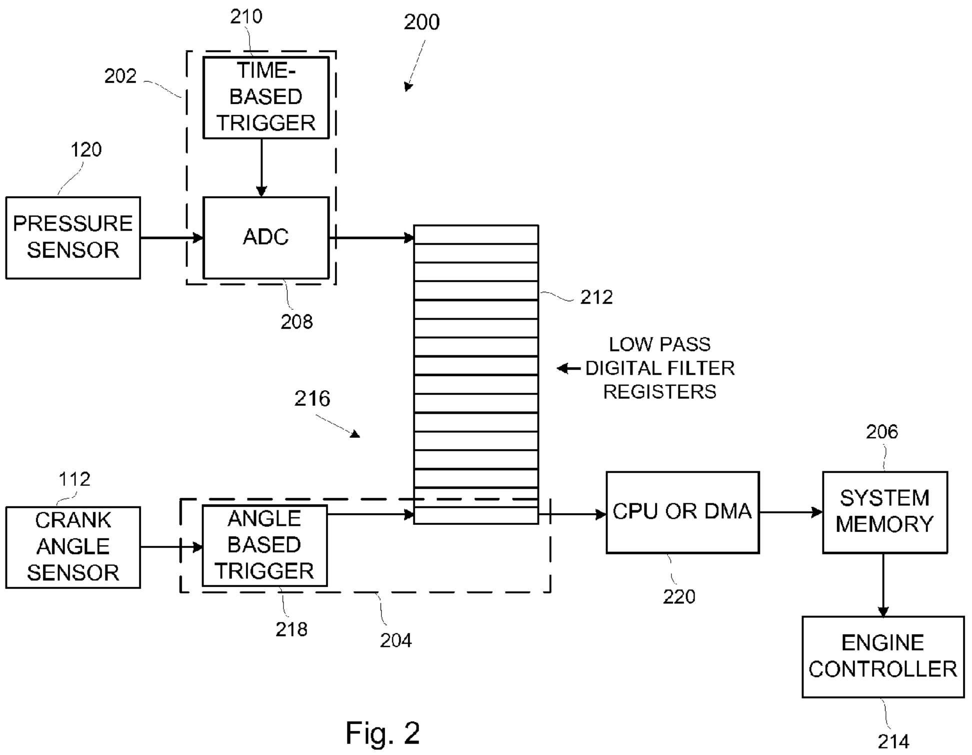
FIG. 2 is a schematic diagram of an example of a data processor for processing position-related input data from a rotational machine in accordance with one embodiment of the invention, given by way of example.

FIG. 2 shows an example of a data processor 200 for processing position-related input data from the engine 100 in accordance with an embodiment of the present invention. The data processor 200 comprises a time-based over-sampler 202, that is to say a hardware or software over-sampling function, for over-sampling the input data at an over-sampling rate greater than the output data rate of the processor, a down-sampler 204 for extracting, by down-sampling, samples of over-sampled data from the over-sampler at the output data rate so as to provide the output data. The down-sampler 204 is responsive to an angular timing signal, from the crank angle sensor 112, related to an angular position of the machine for selecting the samples of over-sampled data to extract based on the angular position. More specifically, the angular timing signal is arranged to trigger the down-sampler to extract a signal currently available from the output of the over-sampler.

In this example, the data processor 200 processes analogue input data from the pressure sensor 120. The over-sampler 202 includes an analogue-to-digital converter ('ADC') 208, triggered by a time-domain clock signal from a time-based trigger 210, and provides the input data in digital form. The down-sampler 204 is part of a decimator 216 also including a low-pass filter 212, which receives data from the ADC 208, the down-sampler selecting samples of data from the output of the low-pass filter 212. The low-pass filter 212 comprises a finite impulse response filter in this example, although other filters, such as an infinite impulse response filter for example, may be used. Furthermore, other types of pass characteristics, such as band pass, may be used.

The selected angle-domain samples of data are exploited by the engine controller, shown at 214 in FIG. 2, which controls operating parameters of the engine, such as cylinder filling and burn parameters, based on the output data. The angular crank-shaft position signal from the sensor 112 is used as a timing signal input for an engine controller 214 (FIG. 2), and the engine controller controls performance-related variables such as cylinder filling and burn parameters, which are functions of the angular crank-shaft position.

In more detail, the analogue pressure signal from the sensor 120 is small and noisy and filtering is used in this example to clean it up, using a fixed-frequency (time based) filter with low pass or band-pass frequency characteristics. However the variation of engine speed makes angle based sampling of the analogue pressure signal time variable, that is to say that, seen in the time domain, the angle-based sampling rate varies. In this example, both data sampled at a rate which is constant in time (the over-sampled data and the data in the filter) and data extracted (down-sampled) at defined angular positions are available without unduly complex calculations, such as recalculating the tap coefficients of the fixed frequency FIR low-pass filter as a function of engine speed, which would make heavy use of processor calculation and memory resources.

More specifically, in the example of FIG. 2, in the over-sampler 202, the ADC 208 samples the pressure signal at moments defined by the time-domain trigger 210 at a constant time rate substantially faster than the maximum desired time or angle based results are needed. This over-sampled data is fed into the filter 212 and down-sampler 204 of the decimator 216. The sampling rate of the over-sampler 202 is greater than the Nyquist criteria required for maximum engine speed. Specifically, low pass filter 212 ensures that the highest frequency of the pressure signal that is retained is less than half the down-sampling rate.

When a sample is needed, it is pulled from the output of the decimator/filter. This occurs at moments defined by the angle trigger 218, thus automatically re-sampling the filtered, time based signal into the angle domain.

Angle-domain data is moved by direct memory access ('DMA') 220 into system random access memory ('RAM'). Alternatively, the central processor unit ('CFU') of the system at 220 may write the data into system memory 206. From the RAM or system memory, the angle domain data is passed to the engine controller 214. The engine controller 214 then controls engine performance parameters as a function of the angle-domain pressure signal samples, including, for example defining a knock window, that is to say a range of crank-shaft angles where knock is likely to occur in the engine.

In another embodiment of the invention, both time-domain and angle-domain pressure signal data are provided to separate buffers and utilised by the engine controller.

In an example of an implementation of the data processor shown in FIG. 2 in an automobile having a multiple cylinder engine, pressure signals from the individual pressure sensors 120 for each cylinder are supplied to respective ADCs 208, which sample the data in the time domain at an over-sampling rate substantially higher than the output data rate. For example, for a four cylinder engine, four pressure sensors provide analogue pressure signals to four ADCs, respectively. A suitable value for the over-sampling rate of the ADCs has been found in one implementation to be 250 k sample/sec, The over-sampled data is then passed to respective ones of four low pass filters and down-samplers 212, 204. The tap coefficients of the filters 212 in this implementation were set to filter the data with a cut-off frequency Fc=25 kHz. Time domain data is spooled from the filters 212 via an ADC queue into a system RAM (not shown), in this implementation at 50 k sample/sec.

The crank position signal from the sensor 112 is processed in a time processor unit 218 to create an angle 'clock' trigger signal. A digital comparator block matches on one degree angle trigger signals. Data is pulled from the output of the decimator 216 at moments based on the angle trigger. It is placed in a separate queue in system RAM.

For pressure sensing, crank angle accuracy is relevant. Production engines have an absolute crank reference of at best 0.3 degrees.

In an example of operation of the engine, the following parameters are obtained:

Engine running at 6000 r.p.m and ADC sampling at 250 k sample/sec 1 degree rotation is 27.78 μs 1 ADC sample every 4 μs Angular error introduced by using the last available time sample:

=zero to 0.14° crank angle (+/−0.07°)

Figure 3:
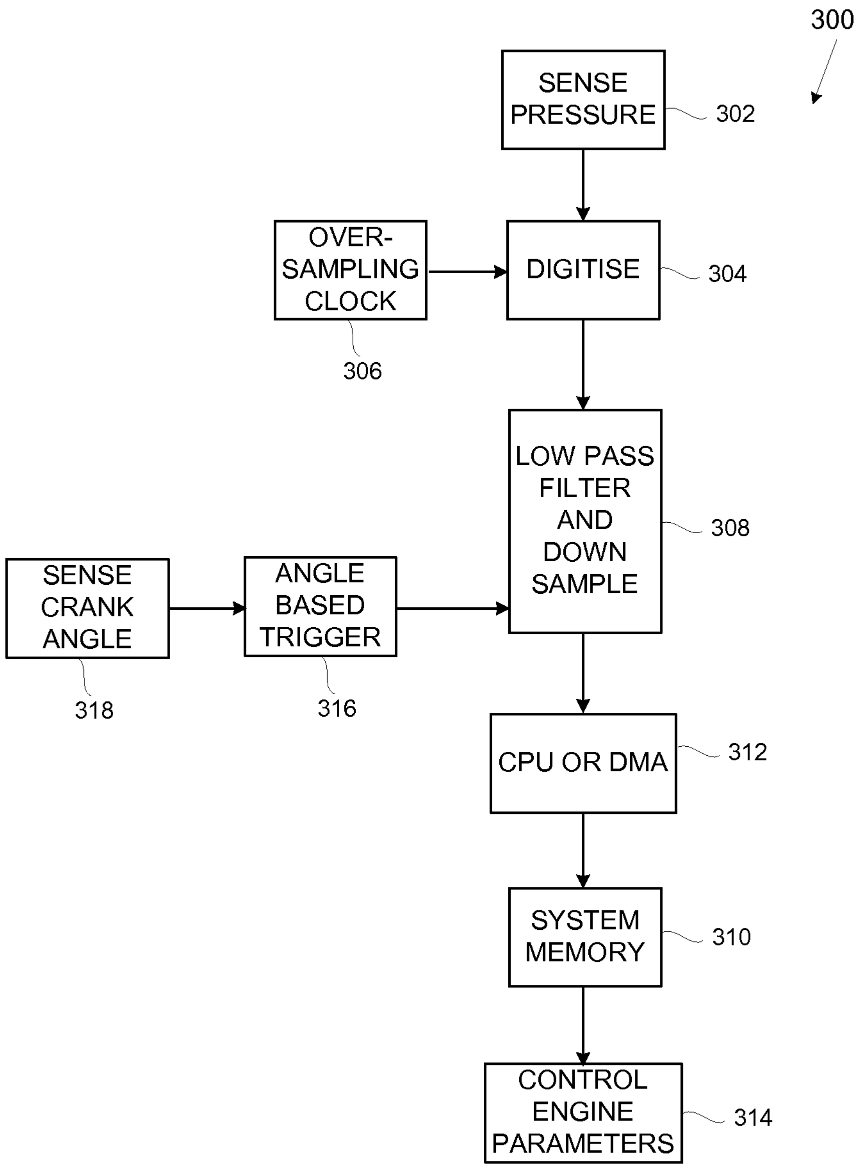
FIG. 3 is a flow chart of an example of a method of processing position-related input data from a rotational machine in accordance with another embodiment of the invention, given by way of example.

FIG. 3 illustrates an example of a method 300 of processing position-related input data from a rotational machine whose angular speed is variable, as applied to data relating to cylinder pressure in an internal combustion engine such as shown in FIG. 1 to provide an output signal with data at an output data rate to an engine controller. The method comprises sensing the cylinder pressure at 302, over-sampling the input data at 304 at a regular time-based over-sampling rate greater than the output data rate, as defined by a clock at 306 to produce an over-sampled signal. Output data is extracted from the over-sampled signal at the output data rate by down-sampling at

308, and extracted output data is registered in system memory at 310 after processing in a DMA or CPU at 312. The extracted data may be used to control engine operating parameters at 314.

The down-sampling at 308 is responsive to an angular timing signal related to an angular position of the machine for selecting the samples of data from the over-sampled signal to extract, the angular timing signal being produced in response to an angle-based trigger at 316 from an analogue angle signal produced at 318, and which may be produced by sensing crank-shaft angle in the case of an internal combustion engine, for example. The angle-based down-sampling occurs at a rate slower than the time-based repetition rate of the over-sampled signal from the ADC. Over-sampling the input data 304 may include converting the input data to digital form in an analogue-to-digital converter. Down-sampling 308 may be performed in a decimator which includes, for example, a low-pass FIR filter that filters the digital signal that comes directly from the ADC at its native over-sampled rate.

The invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette or non-volatile memory, containing data loadable in a memory of a computer system, the data representing the computer program. The data carrier may further be a data connection, such as a telephone cable or a wireless connection.

Some of the above embodiments, as applicable, may be implemented using a variety of different information processing systems. For example, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A data processor for processing position-related input data from a rotational machine whose angular speed is variable and providing output data at an output data rate, the data processor comprising:

an oversampling clock;

an over-sampler coupled to the oversampling clock to over-sample said input data at an over-sampling rate greater than said output data rate based upon an output of the oversampling clock;

a down-sampler for extracting samples of over-sampled data from said over-sampler at said output data rate so as to provide said output data; and an angular timing signal source for producing an angular timing signal related to an angular position of the machine, wherein said down-sampler is connected to said angular timing signal source for selecting said samples of over-sampled data to extract based on said angular position.

2. A data processor as claimed in claim 1, for processing analogue input data, wherein said over-sampler includes an analogue-to-digital converter for providing said input data in digital form and said down-sampler is part of a decimator also including a low-pass filter which receives data from said analogue-to-digital converter, said down-sampler selecting samples of data from said low-pass filter.

3. A data processor as claimed in claim 2, wherein said filter comprises a finite or infinite impulse response filter.

4. The machine of claim 2, wherein the low-pass filter is a fixed-frequency low-pass filter.

5. The machine of claim 2, wherein the extracting samples of over-sampled data comprises extracting samples of over-sampled data without recalculating tap coefficients of the low-pass filter.

6. A rotational machine whose angular speed is variable, comprising a data processor as claimed in claim 1, and a position-responsive sensor for producing said angular timing signal related to the position of a part of the machine.

7. A machine as claimed in claim 6, comprising a rotary engine whose angular speed would be liable to fluctuate during the course of a revolution when in operation.

8. A machine as claimed in claim 7, wherein said rotary engine is an internal combustion engine, and said internal combustion engine includes a sensor responsive to a performance-related variable which is a function of said angular position.

9. A machine as claimed in claim 8, wherein said internal combustion engine includes at least one piston and cylinder set and said sensor is responsive to pressure in said cylinder.

10. A machine as claimed in claim 8, wherein said internal combustion engine has a crank-shaft, and said angular position is an angular crank-shaft position to which said angular timing signal is related.

11. A machine as claimed in claim 6 further including a controller responsive to said extracted output data for controlling an operating parameter of said machine.

12. The machine of claim 11, further comprising:

a first buffer to store the over-sampled data; and a second buffer to store the extracted output data, wherein the controller is responsive to both the over-sampled data and the extracted output data for controlling the operating parameter of the machine.

13. A data processor as claimed in claim 1, wherein said angular timing signal is arranged to trigger said down-sampler to extract a signal currently available from said over-sampler.

14. The machine of claim 1, wherein the over-sampling rate is at least five times greater than the output data rate.

15. A method of processing position-related input data from a rotational machine whose angular speed is variable and providing output data at an output data rate, comprising:

over-sampling by an over-sampler coupled to an oversampling clock said input data at an over-sampling rate greater than said output data rate to produce an over-sampled signal, said output data rate based upon an output of the oversampling clock;

extracting said output data from said over-sampled signal at said output data rate in a down-sampler; and registering the extracted output data, wherein said down-sampling is responsive to an angular timing signal related to an angular position of the machine for selecting the samples of data from said over-sampled signal to extract.

16. A method as claimed in claim 15, for processing analogue input data, wherein over-sampling said input data includes converting said input data to digital form in an analogue-to-digital converter and down-sampling is preceded by filtering a signal from said converter in a low-pass filter.

17. A method as claimed in claim 15, wherein said angular timing signal triggers said down-sampling to extract the current signal from said over-sampled signal.

18. A method as claimed in claim 15, wherein said rotational machine comprises a rotary engine that is an internal combustion engine, and said internal combustion engine includes sensing a performance-related variable which is a function of said angular position.

19. A method as claimed in claim 15 and including responding to said extracted output data for controlling an operating parameter of said machine.

20. A non-transitory computer readable medium encoded with a computer program product adapted to perform a method of processing position-related input data from a rotational machine whose angular speed is variable and providing output data at an output data rate when loaded in programmable apparatus that receives said input data and said angular timing signal, the method comprising the steps of:

over-sampling by an over-sampler coupled to an oversampling clock said input data at an over-sampling rate greater than said output data rate to produce an over-sampled signal, said output data rate based upon an output of the oversampling clock;

extracting said output data from said over-sampled signal at said output data rate in a down-sampler; and registering the extracted output data, wherein said down-sampling is responsive to an angular timing signal related to an angular position of the machine for selecting the samples of data from said over-sampled signal to extract.

* * * * *